Figure 1:
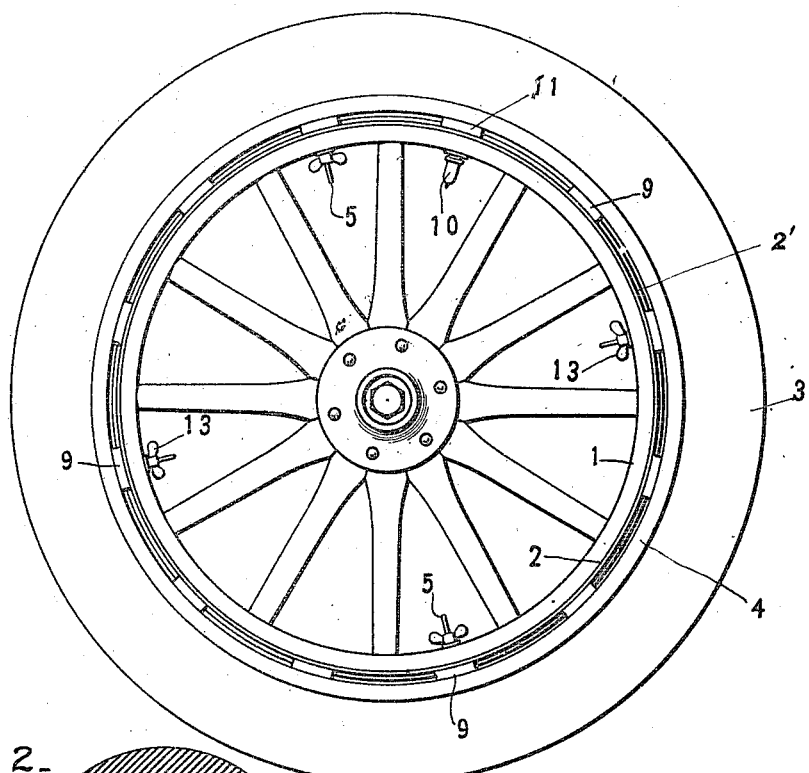

E. A. BAKER.
DEMOUNTABLE RIM CONSTRUCTION.
APPLICATION FILED APR. 21, 1908.

998,666.

Patented July 25, 1911.
2 SHEETS—SHEET 1.

WITNESSES
J. Clyde Ripley.
Edward W. Hill

INVENTOR
Edwin A. Baker.
ATTORNEY

E. A. BAKER.
DEMOUNTABLE RIM CONSTRUCTION.
APPLICATION FILED APR. 21, 1908.
998,666.
Patented July 25, 1911.
2 SHEETS—SHEET 2.
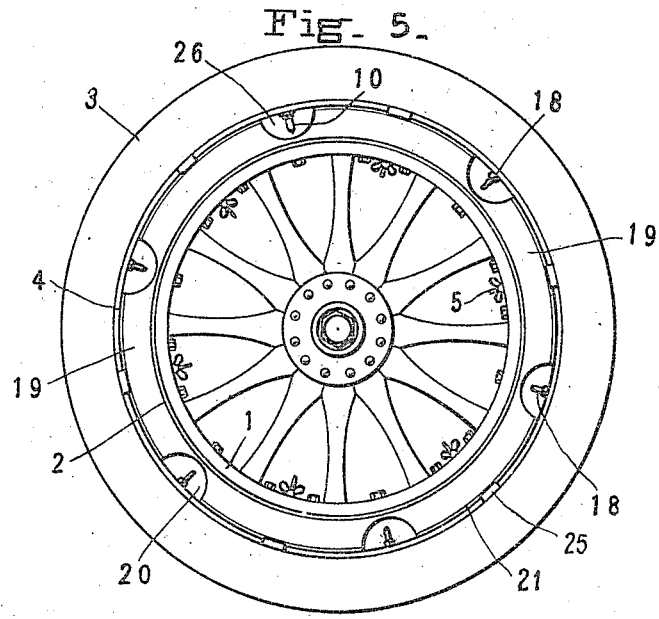
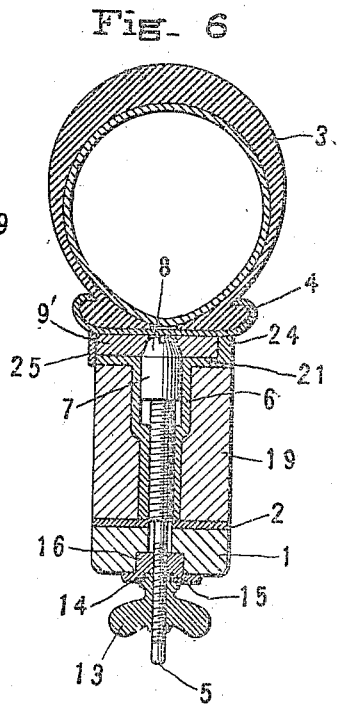
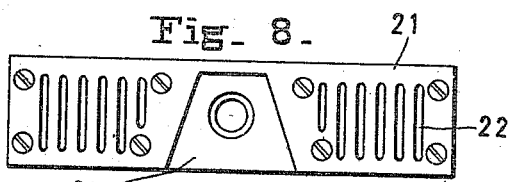
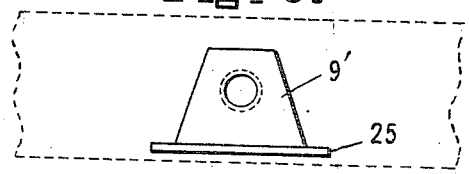
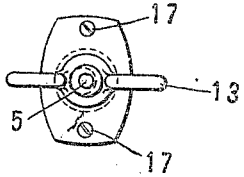
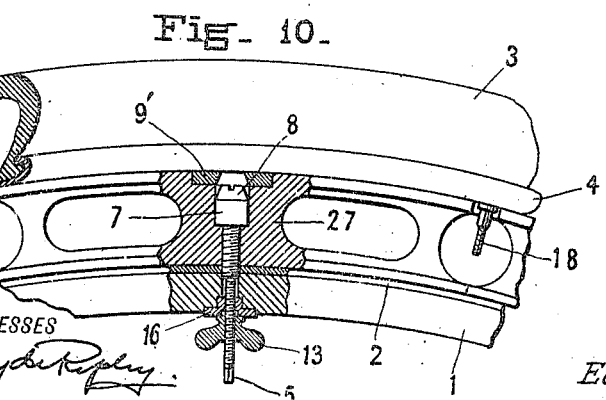
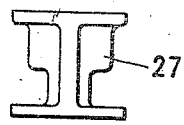
WITNESSES
INVENTOR
Edwin A. Baker
ATTORNEY

UNITED STATES PATENT OFFICE.

EDWIN A. BAKER, OF NEW YORK, N. Y., ASSIGNOR TO RAPID REMOVABLE RIM COMPANY, A CORPORATION OF NEW YORK.

DEMOUNTABLE-RIM CONSTRUCTION.

998,666.      Specification of Letters Patent.      Patented July 25, 1911.

Application filed April 21, 1908. Serial No. 428,383.

*To all whom it may concern:*

Be it known that I, EDWIN A. BAKER, a citizen of the United States, residing at New York, in the county of Kings and State of New York, have invented certain new and useful Improvements in Demountable-Rim Constructions, of which the following is a specification.

My invention relates to improvements in vehicle wheel tires and particularly to a construction in which a pneumatic tire and rim may be quickly mounted and demounted or removed from the wheel proper.

The main object of my invention is to provide a substantial and reliable means for securing the tire and tire-rim to the wheel in such a manner that they will be securely held in place but may be readily removed when desired.

Another object is to accurately seat or center the tire-rim on the wheel and compensate for any inaccuracy in the construction of the tire-rim or the wheel, such as slight buckling of the rim or warping as sometimes occur. In such constructions the tire and rim are subject to enormous strains, sometimes at right angles to the plane of the wheel such as when the wheel comes into forcible lateral contact, for instance with curb stones and car tracks. In some removable or detachable rim constructions, it has been proposed to provide laterally protruding devices for securing the parts together. Such devices are likely to be injured by striking against curbstones, etc., as above mentioned.

One of my objects therefore, is to avoid such difficulties. This I have accomplished by utilizing a radially operable device for securing the tire-rim in place. On account of the impossibility of having the parts fit accurately and remain in perfect condition when in operation, the attaching device must have a considerable range of adjustment so that the tire-rim will be properly seated even though considerably distorted. This I have accomplished by providing a series of blocks secured to the tire-rim and adapted to fit the periphery of the wheel-rim. In conjunction with these blocks the locking devices coöperate. Each locking device consists of a radially adjustable bolt-like member having a tapered end which is adapted to engage in a tapered recess in the underside of one of the blocks attached to the tire-rim. When the tire and rim are placed in position, the locking or attaching devices are then brought into operation and the tapered ends of the bolts being forced into the recesses in the blocks, the tire-rim is drawn into position and all lateral, circumferential and radial play is taken up. The rim is thus held rigidly to the wheel at a plurality of points about the periphery. I also provide a special device for locking the bolts in position and preventing their accidental disengagement.

In utilizing the invention and adapting it to different conditions of use, such as for light wheels, racing wheels and other special uses, somewhat different types have been developed. Some of these are illustrated in the accompanying sheets of drawings and details thereof which are more or less important will be found more fully described hereinafter.

Figure 2:
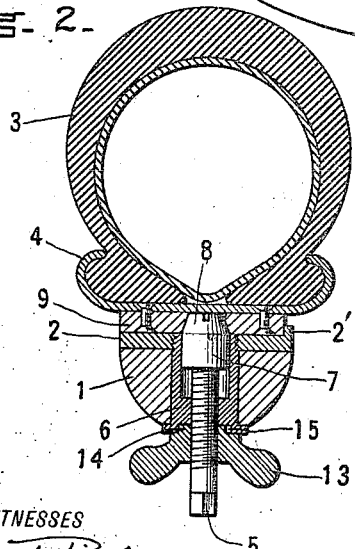
Figure 3:
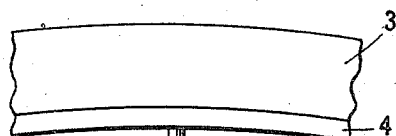
Figure 4:
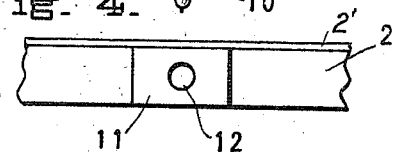

Figure 1. is a vertical projecton of a wheel of one form embodying improvements of my invention. Fig. 2. is a cross-sectional view of the same at one of the locking devices. Fig. 3. is a side view of a fragment of the tire and rim and projecting valve stem. Fig. 4. is a plan view of a fragment of the wheel-rim adapted to receive the tire-rim and valve stem above. Fig. 5. is a side view similar to Fig. 1. of a somewhat different type of construction embodying my invention. Fig. 6. is a cross-sectional view of the tire and rim of the same showing a locking device. Fig. 7. is a detailed view of a special device for preventing accidental movement of the locking device in Fig. 6. Fig. 8 is a detail plan view of one of the platforms or spacing devices of the wheel of Fig. 5. showing a tapered block receiving recess and bolt passage. Fig. 9. is a plan view of one of the tapered blocks secured to the tire-rim and adapted to be seated in the tapered recess shown in Fig. 8, a fragment of the tire-rim being shown dotted. Fig. 10. is a side view and partial section of another type of construction embodying my invention. Fig. 11. is an end view of the platform or spacing device of the construction shown in Fig. 10.

The type of construction shown in Fig. 1 is particularly adapted to such pneumatic tires as employ what is known as short or special lugs which do not project radially from the tire-rim, or if they do project, only a very short distance. Such constructions for securing a pneumatic tire to its rim being well known, it will be unnecessary to explain details of the lugs. The wheel proper may be of any suitable type of construction. In the form shown the wood wheel-rim 1 is surmounted by a steel rim 2. The pneumatic tire 3 is of any suitable type and secured in any suitable manner to the tire-rim 4. The flange 2' serves as a lateral abutment on one side. A plurality of locking devices are provided, for instance four as shown in Fig. 1, each one being designated by the numeral 5. The construction of the rim locks is shown more fully in Fig. 2. The sleeve 6 is secured to the wheel-rim in a suitable manner, for instance by being screwed into the steel rim 2. The shank of the rim lock 5 is screw-threaded and adjustable in a thread in the sleeve 6, so that it may be moved radially. The inner end of lock 5 may be suitably formed, for instance for the engagement of a wrench. The outer end 7 of the rim lock is enlarged and is guided in a correspondingly shaped recess in the sleeve 6. The tip 8 of the rim lock is tapered as shown, so as to more readily engage in a correspondingly shaped recess in the block 9, which is secured in a suitable manner to the tire-rim 4. These blocks 9 afford substantial seats for the rim locks and also space the tire-rim away from the wheel-rim so that the bearing surface between the rims is of much less area than the periphery of the tire-rim. This reduces the friction and danger of adhesion by corrosion to a minimum, so that the tire rim may always be more readily mounted and demounted. At the point of the wheel-rim 2 where the valve-stem 10 comes, I provide a block 11 as shown in Fig. 4 affording a raised platform for the support of the tire-rim and having a perforation 12 to receive the valve stem. The tire-rim being assumed, mounted as shown in Fig. 1, it is prepared for demounting by releasing or retracting the four rim locks 5, 5, 5, 5. The lower part of the tire-rim is then swung outwardly so as to be clear of the wheel-rim. The tire-rim can then be lifted and the valve-stem withdrawn from the recess 12. The mounting of the tire-rim is accomplished in the reverse manner and the insertion of the valve-stem 10 in the recess 12 serves to position the tire so that when it is swung on to the wheel-rim the blocks 9, 9 are brought into proper position for engagement of the rim locks. In order to prevent the rim locks from working loose, I prefer to provide a special check nut or device as shown in Figs. 2, 6, 7 and 10. Wing nut 13 is threaded interiorly and turns on the shank of the rim-lock 5. Integral with the wing-nut is a cam 14, which is adapted to co-act with the walls of an eccentric recess 15 in the sleeve 6 (see Fig. 2). In Figs. 6 and 7, the recess 15 is in a sleeve 16 which is secured in place, for instance by a screw or screws 17. When the wing nut is turned so as to jam the cam 14 against the wall of the eccentric recess 15, it binds on the threads of the rim-lock-shank 5 and prevents the rim lock being unscrewed. To release the rim-lock, the wing-nut is turned a partial revolution so as to disengage the cam from the recess wall. The rim-lock may then be screwed in either direction. For the purposes of assembling or repairing, the rim lock may be removed outwardly from the sleeve 6 (see Fig. 2), after the tire-rim is demounted, by the use of a screw driver in the slot as shown in the tip 8.

The type of construction shown in Figs. 5 and 6 is particularly adapted for such tires with what is known as long lugs 18, 18, etc. These lugs project radially inward and are generally employed for attaching pneumatic clencher tires to their rims. In the construction shown in these figures, a series of spacing members, such as 19, 19, are mounted on the steel wheel rim 2. These provide raised platforms on which the tire-rim 4 is mounted. Between the platforms recesses are formed, such as 20, which are laterally open for the purpose of receiving the lugs 18, 18. Each of these spacing members 19 carries one of the sleeves 6 with a rim lock 5 as before described, and the tire-rim carries a series of blocks, such as 9' for receiving the tip 8 of the corresponding rim lock. This block is preferably tapered as shown in Fig. 9. The periphery of each spacing member 19 is provided with a plate 21 which forms the platform or bearing surface for the tire-rim. To reduce the bearing surface of the plate it may be grooved as at 22, so that there may be less tendency for the tire-rim to bind and cause difficulty in demounting. A tapered recess 23 accommodates the block 9' so that in mounting the rim the blocks circumferentially adjust themselves. In order to limit the movement of the tire-rim in mounting, the shoulder 24 is preferably provided on one side of each of the platform plates 21. To cover the lateral entrance to the recess 23, a plate 25 is provided. In the form shown in Fig. 5 a laterally open recess 26 is provided for the valve stem 10, so that the tire and its rim may be mounted and demounted by straight lateral movement as distinguished from the swinging and vertical movement described in regard to the construction of Fig. 1.

The construction of Figs. 10 and 11 is similar to that of Figs. 5 and 6 except that the spacing members 27 are formed from cored castings as distinguished from the solid blocks. This construction is light and gives great strength and is also more or less attractive in appearance. In Fig. 10 the rim lock 5 is shown retracted.

What I claim is:

1. A vehicle wheel construction comprising, a tire rim, a wheel rim, a series of sleeve members carried thereby having interiorly threaded portions, radially movable locking bolts in said sleeve members and a series of clamping members on said bolts, the members of one of said series of members having recesses eccentric to the bolts and the members of the other series of members having cams coacting therewith for preventing the rotation of the bolts.

2. A vehicle wheel construction comprising a wheel-rim, a tire-rim, a sleeve carried by said wheel-rim and having a threaded passage and a recess at the mouth of the passage with a wall eccentric to said passage, a threaded locking bolt rotatable and radially operable in said passage for centering and securing said tire rim on said wheel rim and a nut operable on said bolt and having a cam on one end adapted to engage the wall in said recess to clamp said locking bolt and prevent its rotation.

3. A vehicle wheel construction comprising a wheel rim, a series of bearing members secured thereto having radial screw-threaded passages and cam walls at the inner ends of said passages eccentric to the passages, threaded locking bolts radially adjustable in said screw threaded passages, interiorly threaded clamping members adjustable on said bolts and having eccentric cam walls coöperating with the cam walls of the bearing members and a tire rim having recesses adapted to receive the outer ends of said locking bolts.

EDWIN A. BAKER.

Witnesses:
 EDWARD W. HILL,
 ROBT. S. ALLYN.